United States Patent [19]

Stevenson

[11] Patent Number: 4,695,609

[45] Date of Patent: Sep. 22, 1987

[54] VULCANIZABLE RUBBER COMPOSITIONS CONTAINING XANTHOGEN POLYSULFIDE AND XANTHATE COMPOUNDS

[75] Inventor: Arthur Stevenson, West Midlands, United Kingdom

[73] Assignee: Robinson Brothers Limited, West Bromwich, United Kingdom

[21] Appl. No.: 790,136

[22] Filed: Oct. 22, 1985

[30] Foreign Application Priority Data

Oct. 25, 1984 [GB] United Kingdom ............... 8427009
May 3, 1985 [GB] United Kingdom ............... 8511378

[51] Int. Cl.$^4$ ............................................. C08C 19/20
[52] U.S. Cl. ................................ 525/352; 525/330.9; 525/332.6; 525/348
[58] Field of Search ...................... 525/330.9, 343, 348, 525/352, 332.6

[56] References Cited

U.S. PATENT DOCUMENTS

| | | | |
|---|---|---|---|
| 2,069,053 | 1/1936 | Whittenberg | 525/343 |
| 2,234,204 | 3/1941 | Starkweather | 524/280 |
| 2,234,215 | 3/1940 | Youker | 524/280 |
| 2,373,375 | 4/1945 | Blake | 524/280 |
| 2,398,998 | 4/1946 | Blake | 524/280 |
| 3,920,623 | 11/1975 | Khan | 524/846 |

Primary Examiner—Christopher Henderson
Attorney, Agent, or Firm—Parmelee, Bollinger & Bramblett

[57] ABSTRACT

A novel mixture comprises a dihydrocarbyl xanthogen polysulphide and a xanthate selected from metal hydrocarbylxanthates and dihydrocarbylxanthates. Such a mixture can be used to cure a vulcanizable rubber composition containing less than 0.4 parts by weight of nitrosatable materials per 100 parts by weight rubber; the use of toxic conventional nitrogen-containing accelerators such as amines can be avoided.

12 Claims, No Drawings

VULCANIZABLE RUBBER COMPOSITIONS CONTAINING XANTHOGEN POLYSULFIDE AND XANTHATE COMPOUNDS

FIELD OF THE INVENTION

The present invention relates to new rubber products and to systems for use in curing rubber.

BACKGROUND OF THE INVENTION

Commercial rubber goods generally include nitrogen-containing materials which are used as, or formed from, curing or accelerating agents.

Dithiocarbamates, e.g. of the formula $(R_aR_bN\text{—CSS-})_yM$, and thiuram sulphides, e.g. of the formula $R_aR_b\text{N—CS—S}_z\text{—CS—NR}_aR_b$, in which y and z are each integers, $R_a$ and $R_b$ are each aryl, alkyl or substituted alkyl and M is a metal such as sodium or zinc, are widely used as accelerators and curing agents for rubber goods. Nitrosamines of the formula $R_aR_bNNO$ are known to be present in, and formed from, corresponding dithiocarbamates and thiuram sulphides. Nitrosamines can also be formed from other N-containing compounds used in rubber processing, e.g. sulphenamides and thioureas.

EPDM (ethylene-propylene-diene-modified) rubber is conventionally cured using a combination of dipentamethylenethiuram hexasulphide, tetramethylthiuram disulphide and tellurium diethyldithiocarbamate. Neoprene is conventionally cured using zinc oxide activated with a thiourea (e.g. ethylenethiourea or diethylthiourea) or a tertiary amine (e.g. hexamethylenetetramine). The given N-containing activators/curing agents are all nitrosatables.

The nitrosamines are recognised to be carcinogenic in animals. Among those nitrosamines tested, only those with exceptional structures, e.g. where $R_a$ or $R_b$ is a tertiary group, have been found to lack carcinogenic activity; see Drucker et al, Zeitschrift fuer Krebsforschung 69 (1967) 103-201 and Lijins et al, J. Nat. Cancer Inst. 49 (1972) 1329-1249. Nitrosamines in which $R_a$ and $R_b$ are each methyl, ethyl, propyl or butyl groups, or $R_a$ and $R_b$ together represent the pentamethylene group, are particularly potent.

Nitrosamines are of potential danger wherever they can come into contact with foodstuffs or sensitive skin, or wherever they can build up in a closed atmosphere, e.g. inside submarines, diving gear or parked cars. There is a risk of exposure to nitrosamines during the manufacture of dithiocarbamates and related compounds, and during their use in manufacturing rubber goods. The presence of nitrosamines in rubber goods is potentially of risk to humans.

Rubber of the type used for baby teats and soothers typically has a nitrosamine content of about 0.5 ppm. Very careful formulation and washing is needed to reduce this concentration to an acceptable level for babies, i.e. below 0.01 ppm. However, because dithiocarbamate accelerators and related compounds are usually used in amounts of about 1% by weight of rubber, there remains, after curing and washing, a substantial residue of N-containing material capable of nitrosation by nitrite in saliva.

Other undesirable N-containing materials are used in rubber processing, including thioureas. Such toxic compounds, and also isocyanates and isothiocyanates, are formed by thermal breakdown in common N-containing curing systems, and are present in the fumes from rubber processing operations.

PRIOR ART

U.S. Pat. No. 1,634,924, U.S. Pat. No. 2,374,385 and U.S. Pat. No. 2,453,689 each disclose the use of dihydrocarbyl xanthogen polysulphides as accelerators in rubber compositions. It is stated in U.S. Pat. No. 1,634,924 (and proved by the given Examples) that the additional presence of an amine "of the aniline type" in the composition is advantageous. It is also stated, although there is no evidence, that no free sulphur need be added. In U.S. Pat. No. 2,374,385, a thiazole or other N-containing compound is invariably used as an accelerator; under the acid conditions, thiazole tautomerism can give nitrosatable secondary amines. In U.S. Pat. No. 2,453,689, "base stock" used for those vulcanisates having the best properties includes a sulphenamide or urea, and alternative N-containing accelerators are suggested. The highest recorded tensile strength is 2700 lb/in$^2$ (18600 kPa).

Example VIII of U.S. Pat. No. 1,634,924 discloses curing a mixture comprising 100 parts smoked sheet (natural rubber), 5 parts ZnO, 5 parts sulphur and 1.25 parts diisoamyl xanthogen tetrasulphide, at about 116 C. This is the only instance given in which no amine is used, and the state of cure is very poor by comparison with the products of the other Examples, in which dibenzylamine, ethylaniline or aniline is present. The amount of sulphur is such that it will almost certainly bloom.

In one reported case in U.S. Pat. No. 2,453,689, a rubber stock comprising solely 100 parts Buna S (synthetic rubber), 55 parts carbon black and 5 parts diethyl xanthogen tetrasulphide is vulcanised at about 120 C. It should be noted that neither zinc oxide nor sulphur is present. The results are said to show that "xanthic sulfides are very active vulcanising agents even in the absence of auxiliary agents such as accelerators and activators", but the product's tensile strength is relatively low, i.e. 1280 lb/in$^2$ (8825 kPa).

In neither of the given specific instances from the prior art is the product likely to be of practical utility. A tensile strength of at least 10,000 and very often at least 20,000 kPa is desirable. Perhaps for this reason, among others, xanthogen polysulphides as described in the given prior art appear not to have been used on any commercial scale, over the last 50 years.

Xanthogen disulphides are used as chain-length modifiers in, for example, emulsion polymerisation processes, and have been proposed as accelerators, almost always in combination with an activator such as dibenzylamine. Known accelerators for use in rubber compositions include xanthates, usually in conjunction with an amine activator.

OBJECTS OF THE INVENTION

A first object of the present invention is to reduce the environmental problems associated with commercial rubber processing and rubber products. A second object is to provide rubber compositions which cure satisfactorily in the presence of as little as possible (and preferably in the absence) of dangerous N-containing materials such as nitrosatables, including tertiary and, especially, secondary amines. It is generally the case that primary amines and unreactive N atoms, such as are in aromatic heterocyclic ring systems, e.g. thiazoles in a conventional, usually non-acidic, rubber composition (cf. U.S. Pat. No. 2,374,385), are non-nitrosatable.

SUMMARY OF THE INVENTION

A novel composition according to the invention, suitable for use as an accelerator in rubber curing processes, comprises a mixture of a dihydrocarbyl xanthogen polysulphide and a xanthate selected from metal hydrocarbylxanthates and dihydrocarbylxanthates.

Novel vulcanisable compositions according to the present invention comprise 100 parts by weight rubber; a dihydrocarbyl xanthogen polysulphide; a xanthate as defined above; and less than 0.4 part by weight of nitrosatable materials (including compounds which are converted to nitrosatables under vulcanisation conditions).

A novel process for preparing a vulcanised rubber article comprises vulcanising a vulcanisable composition comprising 100 parts by weight rubber, a dihydrocarbyl xanthogen polysulphide and less than 0.4 part by weight of nitrosatables, in which either the rubber is in latex form or the rubber is dry and the temperature of vulcanisation is at least 130 C.

DETAILED DESCRIPTION OF THE INVENTION

An article of the invention as defined above or obtained by vulcanisation in accordance with the invention may be shaped in a form intended for or adapted to skin contact. The article may be used by insertion into the mouth, for example, a mouthpiece for use in anaesthesia or oxygen supply in atmospheres of low or nil oxygen content, e.g. a submarine environment. The article may be a baby product such as a teat, soother or dummy. Further examples of articles of the invention (which may contact skin) are goggles, skin-diving suits, gloves (including surgical gloves), surgical rubbers, contraceptives, balloons and furnishings.

The article may be an automobile component, e.g. a tire. An article potentially of particular value is an aircraft tire, owing to the fact that the invention provide vulcanised natural rubber articles free or substantially free of nitrosatables during both manufacture and use, and also because reversion can be low or non-existent. In general, a vehicle may comprise an article of the invention, whether as a tire or as an item of furnishing.

The content of nitrosatables in a composition or product of the invention is preferably as low as possible. Especially when natural rubber is used, the level of harmful material is preferably no more than 0.1, more preferably no more that 0.01 and most preferably no more than 0.001 ppm, with reference to either article or composition. By careful choice of constituents and reactants, an article of the invention can have such characteristics.

The use of N-containing materials such as secondary and tertiary amines is not inevitably excluded from the present invention; in certain circumstances, the use of such compounds appears to be necessary in order to provide a satisfactory degree of cure, especially when the rubber is a synthetic rubber. Nevertheless, the level of such materials, according to the present invention, is considerably lower than has previously been used, and this represents a major technical advance. There is less than 0.4, preferably less than 0.3, more preferably less than 0.2, and most preferably less than 0.1, part nitrosatables. These figures are expressed in parts by weight per 100 parts by weight of rubber.

The present invention is based on the utility of dihydrocarbyl (by "hydrocarbyl", we include substituted hydrocarbyl) xanthogen polysulphides as rubber curing agents; this utility has been made more acceptably effective than hitherto. The polysulphides may have the formula $R^1O-CS-S_x-CS-OR^2$ wherein $R^1$ and $R^2$ are the same or different and are each alkyl, cycloalkyl or N-free heterocyclic groups optionally substituted by substituents which either do not contain nitrogen or do not give rise to nitrosatable amines, and x is at least 2, and often greater than 2. The maximum number of carbon atoms in $R^1$ or $R^2$, and preferably both, is usually about 20. $R^1$ and $R^2$ are preferably each $C_{1-6}$ alkyl and are usually the same, e.g. isopropyl.

A xanthogen polysulphide of the given formula can be prepared by reacting the corresponding xanthogen disulphide with sulphur or by reacting a xanthate salt, e.g. of the formula $R^1O-CS-S-Na$, with a sulphur halide, e.g. $S_2Cl_2$. It is known in the art that the products of these reactions are mixtures of compounds in which x is 3, 4, 5 or higher; when the product is analysed the value of x is not necessarily integral, but the components of the mixture can be separated at least partially by chromatographic techniques. x is often at least 3, e.g. about 4.

The amount of the curing agent as defined above, for vulcanisation, is usually at least 1, preferably at least 1.5, e.g. up to 6, and most preferably 2 to 4, parts by weight per 100 parts by weight of rubber. The curing agent can be formulated with rubber and any other conventional components which may be needed, to form a vulcanisable composition which is then vulcanised. The vulcanisable composition may include sulphur, e.g. in an amount of up to 2 parts by weight per 100 parts by weight of the rubber. The temperature of vulcanisation of a dry rubber composition is preferably at least 130 C, e.g. 140 to 180 C. The vulcanisation temperature is usually 35 to 100 C for a latex. The composition may be formed, before, during or after curing, into a desired article, e.g. via an intermediate sheet form.

It is often desirable, on economic grounds, that the speed of vulcanisation of a cure system used in the invention should be increased by the use of activators. Activators which work satisfactorily with the curing agents of the invention are primary amines and also their sulphonated derivatives (sulphenamides), but it should be noted that sulphenamides are nitrosatable. A suitable primary amine has the formula $R^3NH_2$ wherein $R^3$ is as defined above for $R^1$.

The use of xanthogen polysulphide curing agents can obviate the need for amine or other accelerator materials. In any case, conventional secondary amine accelerators such as dibenzylamine should not be used owing to their nitrosamine-generating properties.

Nevertheless, it has surprisingly been found that xanthates are especially good activators for xanthogen polysulphides. Examples are dihydrocarbyl xanthates and metal hydrocarbylxanthates, e.g. of the formula $R^4O-CS-S-R^5$ wherein $R^4$ is of the same scope as $R^1$ and $R^5$ is a metal or a group of the same scope as $R^1$ (in the latter case, $R^4$ and $R^5$ may be different or, more often, the same); specific examples are zinc isopropylxanthate and dibutyl xanthate. The metal hydrocarbylxanthates are often preferred. The amount of xanthate with respect to rubber may be 0.01 to 5 pphr; it need be no more than 0.05 pphr.

The rubber which is used will be chosen as necessary. It may be in latex or dry form. Moulded, standard white, natural, Hypalon, SBR, neoprene, EPDM and nitrile rubbers may be used. Pre-cure and post-cure rubbers are suitable for forming baby's bottle teats. Natural rubber or synthetic polyisoprene is preferred.

A composition of the invention may include conventional rubber processing additives and components such as fillers, processing aids and anti-oxidants. Carbon black, for example, may be used in an amount of 25 to 400 pphr. A conventional inorganic activator which may be used is zinc oxide. A conventional organic activator and processing acid which may be used is stearic acid. Another known processing aid which may be used comprises a paraffinic processing oil. An anti-oxidant should not be nitrosatable; a phenol such as Antioxidant 2246, i.e. 2,2-methylenebis(4-methyl-6-tertbutylphenol), can be used.

The following Examples illustrate the preparation of rubbers suitable for use in the invention. All parts are by weight.

The procedures of Examples 1 to 9 use a diisopropyl xanthogen polysulphide, principally the tetrasulphide, which is referred to as DIXT, for simplicity. Nitrosatables and other environmentally-undesirable materials are indicated by an asterisk (*).

EXAMPLE 1

100 parts natural rubber, 50 parts precipitated whiting, 5 parts each of micronised zinc oxide and titanium dioxide, and one part Nonox WSP were mixed. The mixture was treated on a mill at 60 C, with the addition of 3.75 parts DIXT and 2.4 parts sulphur. After curing at 145 C, the product, in sheet form, had satisfactory properties.

EXAMPLE 2

The procedure of Example 1 was followed, but the amount of DIXT was reduced to 3 parts, sulphur was omitted and 0.5 part stearic acid was also used. The rubber was masticated for 2 minutes before adding the other four ingredients of the first composition. After mixing, the formulation was sheeted out on a 405 mm (16 inch) laboratory mill, mill additions being made on 305 mm (12 inch) laboratory mill rolls at 60 C. Satisfactory modulus, i.e. 2760 kPa (400 psi) at 600% elongation, tensile strength, i.e. 11650 to 12450 kPa (1690 to 1805 psi) at break, elongation (835 to 860% at break) and hardness (33 to 35 International Rubber Hardness Degrees) were observed following curing at 145 C for times of from 7.5 to 20 minutes.

EXAMPLE 3

The following were formulated (amounts in parts):

| Pale Crepe | 100 |
| --- | --- |
| Stearic Acid | 0.8 |
| Active ZnO | 0.5 |
| Anti-oxidant 2246 | 0.5 |
| Sulphur | 1.5 |
| Magnesium Oxide | 2.0 |
| DIXT | 2.0 |
| Zinc Isopropylxanthate | 0.05 |

Following curing, the composition gave satisfactory properties, comparable to those based on a conventional formulation using dithiocarbamate.

EXAMPLES 4A TO 4K (4A AND 4F TO 4K ARE COMPARATIVE)

The following were formulated (amounts in parts):

| Vistalon 5600 (EPDM rubber) | 100 |
| --- | --- |
| ZnO | 5 |
| Stearic acid | 1 |
| SRF black | 200 |
| Sunpar 2280 | 100 |

The above were mixed in a Banbury mixer, and various additions were made on a mill at 30 C. The respective formulations were then cured at 160 C for 30 min. The additives are tabulated below (amounts in parts), using abbreviations as given above and as follows:

| DTH | dipentamethylenethiuram hexasulphide |
| --- | --- |
| TMT | tetramethylthiuram disulphide |
| Tell | tellurium diethyldithiocarbamate |
| MBTS | mercaptobenzothiazole disulphide |
| ZnIX | zinc isopropylxanthate |
| CuIX | copper isopropylxanthate |
| BiDD | bismuth dimethyldithiocarbamate |
| CuDD | copper dimethyldithiocarbamate |

| Additive | A | B | C | D | E | F | G | H | J | K |
| --- | --- | --- | --- | --- | --- | --- | --- | --- | --- | --- |
| DTH* | 0.8 | — | — | — | 0.8 | — | — | — | — | — |
| TMT* | 0.8 | — | — | — | — | — | — | — | — | — |
| Tell* | 0.8 | — | — | — | — | — | — | — | — | — |
| MBTS | 1.5 | — | 1.5 | — | — | — | — | 0.5 | 0.5 | 1.5 |
| Sulphur | 1.5 | 1.5 | 1.5 | 1.5 | 1.5 | 1.5 | 1.5 | 1.5 | 1.5 | 4.0 |
| DIXT | — | 4.0 | 4.0 | 4.0 | 3.2 | 3.2 | 3.2 | 3.2 | 3.2 | 4.0 |
| ZnIX | — | — | — | 1.0 | 1.0 | 1.0 | 1.0 | 1.0 | 1.0 | 1.0 |
| CuIX | — | — | — | — | — | — | — | — | — | 1.0 |
| BiDD* | — | — | — | — | — | 0.8 | — | 0.8 | — | — |
| CuDD* | — | — | — | — | — | — | 0.8 | — | 0.8 | — |
| Lime | — | — | — | — | — | — | — | — | — | 0.5 |

In degree of cure (Monsanto Rheometer), J=A>H>K>G>F>E>C>D>B, but all the products were fully cured and all were satisfactory. In the products with the highest degree of cure, the initial induction period was almost unacceptably fast. In five separate tests for each, the mean elongation at break and tensile strength at break were 295% and 9900 kPa (1425 psi) for A, 320% and 9250 kPa (1340 psi) for J, and 425% and 8480 kPa (1230 psi) for K, respectively.

The differences between the given results for the Examples of the invention and the comparative Examples are sufficiently small that the primary object of the invention, improvement in the environment, by reducing or eliminating the use of undesirable N-containing and tellurium compounds, is achieved.

EXAMPLES 5A (COMPARATIVE), 5B AND 5C

The following were formulated (amounts in parts):

| Hypalon 40 | 100 |
| --- | --- |
| Maglite DE | 8 |
| Petroleum Jelly | 3 |
| Paraffin Wax | 2 |
| Stearic Acid | 2 |
| TiO$_2$ | 20 |
| Stockalite clay | 40 |
| Dioctyl phthalate | 20 |
| Polyethylene glycol 5200 | 2 |
| Precipitated whiting | 40 |

The above were mixed in a Banbury mixer, and various additions were made on a mill at 30 C. The respective formulations were then cured at 160 C for 30 min.

The additives are tabulated below (amounts in parts), using abbreviations as given above and as follows:

|  | PE | pentaerythritol 200 | |
|---|---|---|---|
| Additive | A | B | C |
| PE | 3.0 | 3.0 | 3.0 |
| DTH* | 1.5 | — | — |
| DIXT | — | 4.0 | 4.0 |
| Sulphur | — | 1.5 | 1.5 |
| ZnIX | — | — | 1.0 |

In degree of cure (Monsanto Rheometer), A>C>B; only A was fully cured, while the others gave an acceptable degree of cure which could almost certainly be accelerated at a higher temperature.

EXAMPLES 6A (COMPARATIVE), 6B and 6C

The following were formulated (amounts in parts):

| Styrene-butadiene rubber | 100 |
|---|---|
| HAF black | 45 |
| Oil | 5 |
| ZnO | 5 |
| Stearic acid | 2 |

The above were treated on a mill at 60 C together with various additions, and the respective formulations were then cured at 160 C for 30 min. The additives (amounts in parts) are tabulated below, using abbreviations as given above and as follows:

| TBBS | N—tert-butyl-2-benzothiazole sulphenamide (Santocure NS) | | |
|---|---|---|---|
| Additive | A | B | C |
| Sulphur | 2.0 | 2.0 | 2.0 |
| TBBS* | 1.0 | — | — |
| DIXT | — | 4.0 | 4.0 |
| ZnIX | — | — | 1.0 |

In degree of cure (Monsanto Rheometer), A, B and C were substantially the same (and satisfactory). In rate of cure, C>B>A.

EXAMPLES 7A TO 7G (7A AND 7F ARE COMPARATIVE)

The following were formulated (amounts in parts):

| Medium nitrile rubber (Krynac 825) | 100 |
|---|---|
| ZnO | 5 |
| Stearic acid | 1 |
| Carbon black N762 | 30 |
| CaCO3 | 30 |
| Dioctyl phthalate | 10 |

The above were treated on a mill at 30 C together with various additions, and the respective formulations were then cured at 160 C for 30 min. The additives (amounts in parts) are tabulated below, using abbreviations as given above and as follows:

| TMS | tetramethylthiuram monosulphide | | | | | | |
|---|---|---|---|---|---|---|---|
| CBS | N—cyclohexyl-2-benzothiazole sulphenamide | | | | | | |
| ZIBX | zinc isobutylxanthate | | | | | | |
| Additive | A | B | C | D | E | F | G |
| MBTS | 1.0 | 1.0 | — | — | — | — | — |
| TMS* | 0.4 | — | — | — | — | — | — |
| Sulphur | 1.5 | 1.5 | — | 1.5 | 1.5 | 0.5 | 1.5 |
| DIXT | — | 4.0 | 4.0 | 4.0 | 4.0 | 4.0 | 4.0 |
| CBS* | — | — | — | — | — | 3.0 | — |
| ZnIX | — | — | — | — | — | — | 1.0 |
| ZIBX | — | — | — | — | 1.0 | — | — |

In degree of cure (Monsanto Rheometer), B>G>E>D>A>F>D, but the differences were small and all were satisfactory. In rate of cure, D>E>G>B>F>A (all substantially fully cured within 10 minutes)>C.

The differences between the given results for the five Examples of the invention and the two comparative Examples are sufficiently small that the primary object of the invention, improvement in the environment, by reducing or eliminating the use of undesirable N-containing compounds, is achieved.

EXAMPLES 8A (COMPARATIVE), 8B, 8C AND 8D

The following were formulated (amounts in parts):

| Neoprene WRT | 100 |
|---|---|
| Stearic acid | 0.5 |
| Maglite DE | 4 |
| Antioxidant 2246 | 2 |
| Carbon black SRF | 50 |
| Dibutyl phthalate | 5 |
| Shellflex 273 | 5 |
| Paraffin wax | 2 |
| Zinc oxide | 5 |

The above were treated on a mill at room temperature, together with various additives. The respective formulations were cured at 160 C for 30 min. The additives (amounts in parts) are tabulated below, using abbreviations as given above and as follows:

| DETU | diethylthiourea | | | |
|---|---|---|---|---|
| Additive | A | B | C | D |
| DETU* | 0.5 | — | — | — |
| DIXT | — | 4.0 | 4.0 | 1.5 |
| Sulphur | — | 1.5 | 1.5 | 1.5 |
| ZnIX | — | — | 1.0 | 0.5 |

The degree of cure was substantially the same, and satisfactory, for all four formulations (despite the low amounts of additives in Example 8D).

EXAMPLES 9A TO 9E (9E IS COMPARATIVE)

A typical commercial high-ammonia latex (0.5% w/w as NH3) was partially deammoniated to 0.14% w/w as NH3 in the presence of a non-ionic stabiliser (Texafor A60). This latex was then used in five formulations, in which the ingredients were incorporated as solutions, emulsions or dispersions as appropriate. The ingredients (amounts in parts) are tabulated below, using abbreviations as given above and as follows:

| ZnBD | zinc dibenzyldithiocarbamate | | | | |
|---|---|---|---|---|---|
| ZnDC | zinc diethyldithiocarbamate | | | | |
| Ingredient | A | B | C | D | E |
| Latex | 100 | 100 | 100 | 100 | 100 |
| Texafor A.60 | 1 | 1 | 1 | 1 | 1 |
| Sulphur | 1.5 | 1.5 | 1.5 | 1.5 | 1.5 |
| Zinc oxide | 0.5 | 0.5 | 0.5 | 0.5 | 0.5 |
| DIXT | 2 | 1.5 | 1.5 | — | — |
| ZnBD* | — | — | 0.2 | 0.2 | — |

-continued

| | | | | | |
|---|---|---|---|---|---|
| ZnIX | — | 0.3 | 0.3 | — | — |
| ZnDC* | — | — | — | — | 1 |

The compositions were each divided into two equal parts and used in liquid and dried forms, i.e. processes known in the trade as "pre-cure" and "post-cure" systems, respectively.

(a) Pre-cure

The pre-cure compositions were cured to a "Chloroform Number" of 3.5–4.0 at 70 C; the times taken to reach this state of cure were, for formulations A to E, >7, 5, 2, 4 and 2, respectively.

The pre-cure formulations were strained, flowed into films and dried at room temperature. The films were tested for tensile strength at break (Tb) and elongation at break (Eb). The results were as follows:

| Formulation | Tb(kPa) | Eb(%) |
|---|---|---|
| A | 21900 | 920 |
| B | 22270 | 950 |
| C | 17930 | 800 |
| D | 27750 | 1000 |
| E | 26200 | 850 |

The dried films were further cured by heating to 100 C for 30 minutes, with results as follows:

| Formulation | Tb(kPa) | Eb(%) |
|---|---|---|
| A | 28960 | 950 |
| B | 32400 | 1000 |
| C | 26550 | 800 |
| D | 36270 | 1050 |
| E | 28750 | 850 |

The ultimate state of cure of B (N-free) is thus seen to be on par with that of the conventional (N-containing) system E using zinc diethyldithiocarbamate as the accelerator.

(b) Post-cure

The post-cure compositions were flowed into films, dried at room temperature, and then cured for different periods of time at 100 C. In the following Table, $Tb_0$ and $Tb_{20}$ respectively indicate the tensile strength without curing and after curing at 20 min., $Eb_{60}$ indicates the elongation at break after curing for 60 min. etc. Tensile strength values are in kPa and elongation values in %.

| Formulation | $Tb_0$ | $Eb_0$ | $Tb_{20}$ | $Eb_{20}$ | $Tb_{40}$ | $Eb_{40}$ | $Tb_{60}$ | $Eb_{60}$ |
|---|---|---|---|---|---|---|---|---|
| A | 4340 | 1000 | 5170 | 1200 | 2760 | 1100 | 2410 | 1125 |
| B | 6900 | 1175 | 9830 | 1275 | 11030 | 1250 | 10340 | 1275 |
| C | 7720 | 1100 | 18270 | 1100 | 30680 | 1000 | 33790 | 1000 |
| D | 7930 | 1000 | 15860 | 1100 | 20550 | 1100 | 21430 | 1100 |
| E | 9310 | 1100 | 32060 | 950 | 31370 | 900 | 28480 | 900 |

Formulations B and E of Example 9 were further tested, by maturing them at 37 C for 4 days, followed by further curing at 45 C for 8 hours. After this period, both formulations reached a cure state as represented by a "Chloroform Number" of 3.5–4.0.

Both were strained and then flowed into films, dried at room temperature and tested, with the results:

| Formulation | Tb(kPa) | Eb(%) |
|---|---|---|
| B | 17930 | 830 |
| E | 22750 | 830 |

The above films were heated in an oven at 100 C for 30 minutes and re-tested, with the results:

| Formulation | Tb(kPa) | Eb(%) |
|---|---|---|
| B | 34470 | 900 |
| E | 35850 | 850 |

Use of the totally N-free formulation B gives results quite comparable to those given by the conventional N-containing formulation E.

EXAMPLES 10A TO 10D

The following were formulated (amounts in parts):

| | |
|---|---|
| Premasticated pale crepe | 100 |
| Anti-oxidant 2246 | 0.5 |
| Stearic acid | 0.8 |
| Zinc oxide | 0.5 |
| Sulphur | 1.5 |

The above were treated on a mill together with various additives, and were cured at 160 C. The additives (amounts in parts) are tabulated below, using abbreviations as given above and as follows:

| DIXD | diisopropyl xanthogen disulphide | | | |
|---|---|---|---|---|
| Additive | A | B | C | D |
| DIXD | 2.5 | 2.5 | — | — |
| DIXT | — | — | 2.5 | 2.5 |
| ZnIX | — | 0.2 | — | 0.2 |

The rate of cure was D>C>B>A. All four formulations were satisfactorily cured within a maximum of 10 min.

I claim:

1. A vulcanizable composition which comprises 100 parts by weight rubber; from about 1 to about 6 parts by weight dihydrocarbyl xanthogen polysulfide of the formula $R^1O-CS-S_x-SC-OR^2$ wherein $R^1$ and $R^2$ are the same or different and selected from the group consisting of alkyl, cycloalkyl and N-free heterocyclic groups and x is an integer of at least 2; from about 0.01 to about 5 parts by weight of a xanthate compound selected from the group consisting of dihydrocarbyl xanthates and metal hydrocarbylxanthates of the formula $R^4O-CS-S-R^5$ wherein $R^4$ is selected from the group consisting of alkyl, cycloalkyl and N-free heterocyclic groups and $R^5$ is selected from the group consisting of a metal and $R^4$; and less than 0.4 parts by weight of nitrosatable materials.

2. A composition according to claim 1, in which the rubber is in latex form.

3. A composition according to claim 1, which comprises from 1.5 to 4 parts by weight of the dihydrocarbyl xanthogen polysulphide.

4. A composition according to claim 1, in which the xanthate is a metal alkylxanthate.

5. A composition according to claim 1, in which the polysulphide is a dialkyl xanthogen polysulphide.

6. A composition according to claim 1, which additionally comprises sulphur.

7. A composition according to claim 4 in which the metal alkylxanthate is zinc isopropylxanthate.

8. A composition according to claim 4 in which the metal alkylxanthate is zinc isobutylxanthate.

9. A composition according to claim 5 in which the polysulphide is diisopropyl xanthogen tetrasulphide.

10. A composition according to claim 5 in which the polysulphide is diisopropyl xanthogen disulphide.

11. A composition according to claim 1 in which the polysulphide is diisopropyl xanthogen tetrasulphide and the xanthate is zinc isopropylxanthate.

12. A composition according to claim 11 which comprises 1.5 to 4 parts by weight of the polysulphide and 0.05 to 5 parts by weight of the xanthate.

* * * * *